Feb. 28, 1967     R. D. COOKSLEY     3,306,570
VALVES AND VALVE STRUCTURE
Filed Oct. 7, 1963          7 Sheets-Sheet 7 ns Patent Office 3,306,570
Patented Feb. 28, 1967

3,306,570
VALVES AND VALVE STRUCTURE
Ralph D. Cooksley, Philadelphia, Pa., assignor to R. D. Cooksley Manufacturing Company, Hartford, Conn., a corporation of Connecticut
Filed Oct. 7, 1963, Ser. No. 314,236
9 Claims. (Cl. 251—30)

This invention relates to valves and valve structures and has for an object the provision of a valve characterized by the absence of actuating elements in the form of stems, springs and other mechanical devices for actuating the movable valve elements between open and closed positions.

Though in the past it has been proposed to utilize line pressure for the actuation of the valve, such proposed arrangements have left much to be desired in the achievement of reliability of operation, long life, and adaptability to a multiplicity of valving requirements.

In accordance with the present invention, there is provided a valve base including a valve seat which is itself a unitary structure to be soldered, brazed or threaded to associated piping. By providing an independent base for the valve, soldering and brazing temperatures can be utilized without possibility of injuring the movable parts of the valve and their associated structures. The body part of the valve is provided with alignment pins to assure proper and correct assembly with the base, and the body includes a chamber within which there is disposed a movable valve element in the form of a freely floating member. There is in communication with the upper portion of the float chamber a channel which includes a pilot valve structure which, when opened, completes the communication from the chamber to the low pressure side of the valve.

With the pilot or control valve closed, line pressure will, through a restricted passageway extending circumferentially of the float member, build up in the float chamber and will, accordingly, be effective to actuate the movable float member to the closed position and to maintain it closed. An exceedingly small movement of the control valve, of a few thousandths of an inch, will permit the escape of the pressure in the float chamber above the float member, and, hence, will render immediately effective the inlet line pressure to move the float member toward open position. Its rate or speed of movement will depend upon the effective area and length of the flow channel extending about its periphery. Either slow or fast opening may be readily attained and the extent of movement of the float member readily regulated by either fixed or adjustable stops.

The valve of the present invention is further characterized by sealing elements both for the main valve and the control valve which are securely and mechanically interlocked with the movable parts, and in such manner as to be incapable of dislodgement therefrom by any of the high fluid pressures likely to be encountered in many uses of the valve. Additionally, flexible seals of the reentrant type with multiple sealing surfaces are utilized for the control valve which may itself be manually or electrically operated and can be made either to "fail-safe" with the valve in its open position, or, alternatively, in its closed position depending upon the particular application for the valve.

In accordance with a still further aspect of the invention, more than one main valve may be utilized with each floating element thereof movable to its own predetermined position and all controlled by a single pilot or control valve. In this manner, there is achieved a flow-proportioning system which in its simplest form can be directly applied to the mixture of hot and cold water for normal use of basins, showers, and the like, while in its more complicated version, such multiple structure may be utilized for controlling the inter-mixture of a multiplicity of reagents and buffer streams of chemical processing plants.

By reason of the controlled movement of the float member of the valve, it readily adapts itself for timing operations. Thus, a momentary opening of the pilot valve will result in rapid, full opening of the main valve with a slow closing movement completed during a predetermined time interval. One application of such a timing valve is for urinals, but can be equally utilized for other applications, and the same principle can be utilized for and in connection with the mixing valve mentioned above.

For further objects and advantages of the invention and for examples of the several forms which it may take, reference is to be had to the following description taken in conjunction with the accompanying drawings in which.

Figures 1, 2, 3:
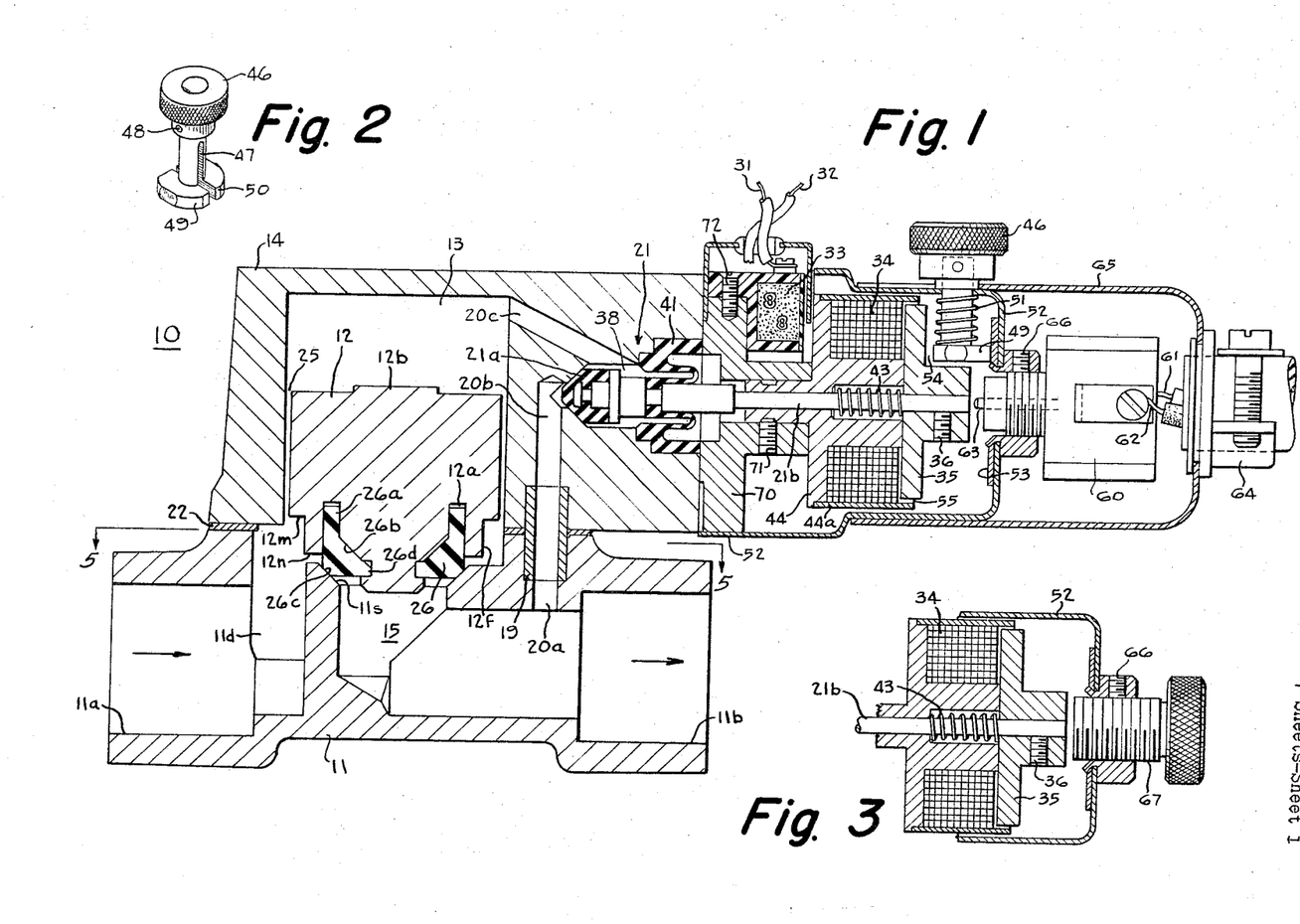
FIG. 1 is a sectional view of a valve embodying the invention.
FIG. 2 is an isometric view of the manual operator for the valve of FIG. 1.
FIG. 3 is a sectional view including the magnetic operator of FIG. 1 with the auxiliary switch structure removed and a manual operator of a different type substituted therefor.
Figure 5:
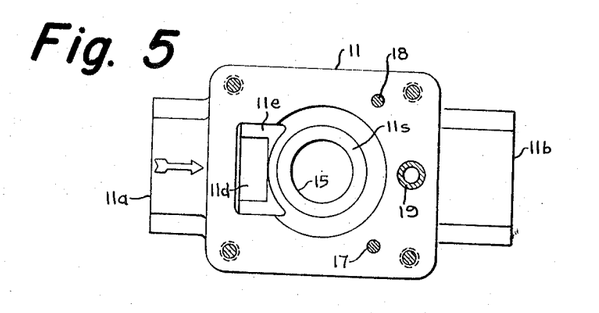
FIG. 5 is a top plan view of the valve base taken on the line 5—5 of FIG. 1 with the body and associated structure removed.

Referring now to FIG. 1, there has been disclosed a valve structure 10 having a base 11 with an inlet opening 11a to which an inlet pipe may be soldered, brazed or in some cases threaded. An outlet pipe is similarly secured in an outlet opening 11b. This valve base 11 is utilized as a separate element to form a part of the piping structure, and in the absence of its associated parts including a freely movable floating member 12 disposed within a float chamber 13 of the valve body 14. Thus, as shown in FIG. 5, the base 11 is a rugged part dimensioned to suit any desired pressure requirement in the piping system and with which it forms a part by reason of its attachment to the inlet pipe by way of the boss on which the arrow appears and to the outlet pipe by way of the boss through which the hole 11b extends. Centrally of the base 11 is the opening 15 concentric with the tapered valve seat 11s. The passageway 11d is rectangular in cross section and at its upper end 11e is more or less kidney-shaped, it being understood that the cross-sectional areas of these passages approximate the same flow area as the opening 15 through the base from inlet to outlet.

Figure 4:
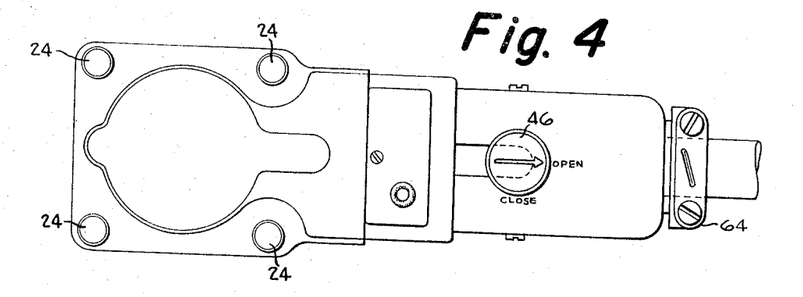
FIG. 4 is a top plan view of the valve of FIG. 1.

In order accurately to register the body of the valve with the base, two centering pins 17 and 18 extend into openings of the base and in which they may be secured if desired and also upwardly from the base 11 to register with complementary openings in the body. The centering arrangement also includes a short length of pipe 19 seated within the counterbored opening of base 11 and which forms a part of the channel or flow pasage 20a which extends from the down-stream side of the valve by way of a flow passage 20b, past the sealing element 21a of a pilot or control valve 21, and thence by way of passage 20c to the upper portion of the float chamber 13. The nipple or short length of pipe 19 also registers with a counterbored portion of channel 20b, and thus there is provided the three geometrical centering devices 17, 18 and 19 to assure accurate registration of the body 14 with the base 11 of the valve. A suitable gasket 22 is interposed between the flat faces of the body member and the base member and suitable cap screws 24 extend through the body member and into threaded openings of the base 11, only the upper ends of these screws having been illustrated in FIG. 4.

With the parts in their illustrated positions, the inlet pressure of a fluid stream at opening 11a is transmitted to the float chamber 13 by way of an annular flow passage 25 extending the length of the float member 12 between its outside surface and the internal surface of the float chamber 13. By reason of the build-up of this pressure in the float chamber 13, the float member 12 is urged downwardly toward the valve seat 11s. A valve-closing element 26 is thereby pressed against the seat 11s tightly to close the valve and prevent leakage therethrough. Where the valve is applied to applications involving high pressures and which may also include fluids of high temperature, the sealing member 26 may be selected of suitable heat-resisting alloys, such as bronze. However, for those applications generally classified as for oil, water and gas, it is preferred that the sealing element 26 be made of one of the synthetic resins including rubber-like materials, such as butyl rubber, buna-N, neoprene, and "Teflon," "Kel-F" and other resins from the polymers of tetrafluoroethylenes or polymers of trifluorochloroethylene.

In acordance with this invention, the sealing element 26 is of single molded type of construction characterized by an annular base portion 26a nesting within an annular groove 12a of the float member 12 and including a thickened portion having one tapered flat face 26b resting against an opposing tapered face of float member 12, the thickened portion having an opposite tapered surface 26c forming the sealing surface complementary to the tapered surface 11s forming the valve seat. The sealing member 26 terminates in a radially extending annular portion 26d nesting within an annular groove formed in the lower end of the float member 12. Thus, under the closing pressure applied to the upper surface 12, the sealing member 26 is under compression and resultant forces are applied to it in directions urging it more firmly into its retaining grooves including the radial groove at the lower end of member 12 and the axial groove 12a of that member in which clearance is provided for movement of the rubber-like sealing material. By thus providing the interlocking structure between the sealing member 26 and the float member 12, there is minimized the possibility that fluid pressure will dislodge the sealing element from the float member. Instead, it is firmly held in place and assures a tight seal and long life in use, a contributing factor to the latter being the opposed frusto-conical surfaces heretofore referred to as the tapered surfaces and also a built-in limit on the maximum sealing forces which can be applied to member 26. More particularly, the maximum movement of float member 12 toward the seat 11s is predetermined by the length of the reduced cross-sectional area of the lower end portion 12f of the float member 12. A small air gap has been illustrated to show that under a higher pressure there may be greater deformation of the sealing member 26 before the lower end of member 12 seats against the upper surface of the valve seat 11s. By referring to the sealing element 26 as being deformable, it is also to be pointed out that it is elastic and does not take a permanent set but returns substantially entirely to its original shape after being subjected to compressive forces.

To open the valve 10, it is only necessary momentarily to deenergize the control circuit which may extend by way of conductors 31 and 32 to the full wave rectifier encapsulated in the structure 33 and which serves to control the energization of an electromagnet 34 having an armature 35 secured as by a set screw 36 to the stem 21b of the pilot valve.

With the pilot valve 21 in the closed position, the high pressure in float chamber 13 is applied to the pilot chamber 38 in which the sealing member 21a is disposed. This sealing pressure is applied to a sealing member 41 securely mechanically interlocked with the stem 21b and which by the reentrant structure of that sealing member is effective for the development of sealing pressures extending radially inward to press a flat section of the sealing member against the stem and is also effective outwardly to press the sealing member 41 against the body 14.

Figure 6:
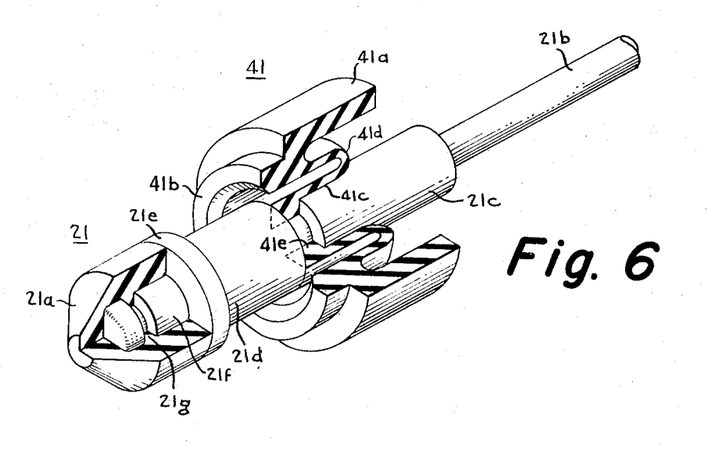
FIG. 6 is an isometric view of the stem structure of the pilot valve including its reentrant sealing structure.

The foregoing sealing functions will be readily understood by reference to the exploded view of FIG. 6 in which it will be seen that the sealing member 41 includes an outer axially extending cylindrical portion 41a and which has a shorter axially extending cylindrical portion 41b providing therebetween a right-angle shoulder. Thus, there may be utilized both the radially and axially extending surfaces of sealing element 41 for its sealing action and the radially extending surfaces on both ends of sealing member 41. This sealing member 41 likewise includes what may be termed a reentrant portion 41c, cylindrical in shape, and including a bellows fold 41d, the cylindrical portion 41c terminating in an enlarged circular end 41e tightly pressed within an annular groove formed in the enlarged cylindrical portion 21c of stem 21b. The stem 21b has a still larger cylindrical section 21d which itself terminates in a flange 21e from which there extends the end portion 21f to which the sealing element 21a is mechanically interlocked.

The sealing element 21a has a tapered end portion in the shape of a frustum of a cone which meets the complementary seating surface 14a in the body 14 and also has a cylindrical portion which tightly grips the end 21f of the stem. Intermediate the conical end portion and the cylindrical portion, there is an internally extending flange or projection 21g which tightly fits into a relatively deep groove in the end portion 21f. Thus, the sealing element 21a is rigidly retained in place, may not be dislodged by fluid pressure and yet may be made of the same resilient materials as sealing elements 26 and 41. Moreover, the fluid pressure acts to hold the sealing element 21a in place.

The pilot or control valve 21 embodies a balanced-pressure construction achieved by reason of the enlarged cylindrical portion 21d which terminates in the short annular surface between it and the flange 21e. Thus the area of this flange is approximately equal to the area of the annular surface of the reentrant portion of the sealing member 41. With the areas thus balanced, the pressure admitted to the pilot chamber 38 acts upon these oppositely disposed surfaces until those forces tending to move the valve stem in one direction or the other are effectively sealed. The thickened section of this sealing element additionally contributes to the foregoing action.

Since the stem 21b of the pilot or control valve 21 is pressure-balanced, it may be moved to and from the valve-closing position with little effort. Accordingly the stem itself may be made of temperature-responsive material for elongation and contraction in response to the ambient temperature. Preferably, however, a bimetallic snapping disc, a coiled bimetallic actuator or a thermostat of the cantilever type exposed to the ambient temperature in a position spaced from the temperature effects of the valve itself can actuate the stem 21b of the valve as through a conventional linkage.

Upon deenergization of electromagnet 34, a spring 43 disposed in an enlarged opening of the magnet structure 44 moves the armature 35 to the right and also moves the stem 21b to open the pilot valve to complete communication between flow channels 20c and 20a. This completes a connection between the float chamber 13 and the low pressure, down-stream side of valve 10. The immediate release of the pressure in chamber 13 makes effective the inlet pressure on the lower part of float member 12 to move it upwardly and to open the valve.

With the float member 12 in its closed position, the inlet pressure is largely effective on the annular face 12m and the annular face 12n. As the float member 12 moves from the closed position, the pressure tending to move it upwardly is then distributed over the whole of the lower face of the float member. The effective force on the float member 12 developed by the pressure applied to the whole of its lower face moves it upwardly at a speed which depends upon the rate of displacement of the fluid from the float chamber 13. The speed of opening will be greater with gases than it will be with liquids. Thus a finite time is required to move from the chamber 13 through the bypass passageway 20c, 20b water with which it may be filled. The rate of flow will depend upon whether or not the pilot valve 21a is acting as a throttling valve or whether it is completely open. As the fluid flow increases through the outlet of the valve 11, the higher velocity of the liquid in the region of the opening of passageway 20a aids in removing the liquid from chamber 13 by a reduction in pressure at the outlet of channel 20a caused by the high velocity of the flow.

In the event that the valve 10 is to be closed manually and without energization of the circuit including conductors 31 and 32, an actuating knob 46 is provided for that purpose. This knob and its associated structure is best shown in FIG. 2. From knob 46 there depends a shaft 47 secured to the knob as by set screw 48. The lower end of the shaft 47 is split, that is, it has a central slot extending therethrough. From the two leg portions there extend cams 49 and 50 having flat faces. A spring 51 biases downwardly the assembly which is journaled in a housing 52 which serves to enclose the electrical actuating assembly. As shown in FIG. 1, the cam elements 49 and 50 have their flat faces bearing against a reenforcing member 53, thus providing at their diametrically opposite sides the space or air gap 54 which, it will be noted, is relatively short but adequate for the needed opening of the pilot valve. This movement may be of a very low order. With the armature 35 in its right-hand position against the left-hand flat face of cams 49 and 50, rotation of knob 46 moves armature 35 to the left and concurrently moves the stem 21b to the left to close the pilot valve. In the closed position, the flat faces of the cams are pressed against the opposing face of the armature, thus providing a stable position for the manual operating knob.

As the pilot valve 21 is closed, there is a build-up of pressure in chamber 13, this pressure being from the inlet side of the valve which, of course, is always greater than the down-stream outlet side thereof. More particularly, the flow of fluid through the opening 15 produces a zone of lower pressure in the region of that opening (the Burnoulli principle), and, thus, as the pressure rises in chamber 13, the effective force on the upper face of the float member 12 exceeds that on the lower face. The float member 12 moves downwardly and at a rate depending again upon the effective area of the passage 25 and the magnitude of the differential of pressure between the upper and lower faces of member 12. This float member 12 may be caused to move rapidly or quite slowly as may be desired and to bring the sealing element 26 firmly into engagement with the seat 26c to close the valve without pounding, hammering or other undesired actions.

The float member 12 with a diameter of one inch may have a height of one-half inch or more. For such a diameter of the float, the height thereof or the length of the flow passage 25 may be greatly increased, as by several times, without changing the substantial uniform leakage. For floats of greater diameter, this same general relationship holds for constant spacings. By providing a small flow passage 25 the float chamber 13 can be made to close slowly and act as an automatic timing device for the period during which the valve will remain in its open position.

As later explained, the time required for closing also depends upon the total length of travel of the float member. This can be regulated by original design of the length of the float chamber or by the provision of an adjustable stop as later described.

It is to be further noted that as the valve approaches its closed position, one would expect that it would close with increasing acceleration. This tendency, however, is offset by the fact that any increased acceleration of float 12 correspondingly reduces the pressure in float chamber 13 and thus reduces the magnitude of the force tending to move the float member 12. The end result is that it moves gently and firmly into closed position and it is pressure-biased into that position. As soon as closed, the effective area to which fluid pressure is applied in a valve-opening direction is greatly reduced. It is reduced by an amount equal to the area of opening 15. The fluid pressure captured in the float chamber 13 remains and continues to be effective to hold the valve in its closed position.

If after opening the pilot valve 21 it is desired to reclose it, as from a thermostat or other remotely located control device, the energizing circuit, through conductors 31 and 32, is closed to apply alternating current to the full-wave rectifier 33 (later to be described), thus to energize the coil 34 with direct current.

The supply voltage for the full-wave rectifier 33 will be conventional, generally 24 volts. The transformation of alternating current to direct current minimizes heat-generation and prevents chattering of the magnet and other undesired noise. It also greatly contributes to the pulling power of the magnet which is quite high for the amount of current which flows upon energization of the circuit. It is a feature of the invention that armature 35 has an air gap 55 between its outer periphery and the inner surface of the cylindrical outer magnetic structure 44a. Additionally, the armature 35, in its illustrated position, abuts against the central part of the magnetic structure 44 and has a thickness in its outer peripheral portion greater than the overhanging length of the cylindrical member 44a. Thus, advantage is taken of a preferred flux path between the right-hand end of cylindrical member 44a and the armature 35. This relationship assures continued development of the attractive force to hold the pilot valve closed. When deenergized, there is a rapid and quick release of the armature 35 by reason of the air gap. The effect of residual magnetism on the operation is overcome.

In some applications it is desirable to control auxiliary apparatus in coordination with the opening and closing of the main valve 10. To this end, the spring 43 is made strong enough to actuate an electric switch 60 and to open and close the circuit extending between conductors 61 and 62. Of course, the switch 60 can be either single-pole or double-pole and it may be of the single-throw or double-throw type. Upon deenergization of electromagnet 34, the right-hand end of stem 21b engages an actuating button, specifically the left-hand end of an actuating shaft 63 which operates the switch 60 between its two circuit-controlling positions. Thus, as the coil 34 is deenergized, the circuits controlled by switch 60 may be closed, or, alternatively, they may be opened as each particular application may be required. In this connection, those skilled in the art understand the requirements of a heating system will normally be just the opposite of a cooling system. A wire clamp 64 is carried by a housing 65 which, it will be observed, telescopes over the housing 52.

Where the auxiliary switch is not desired, the housing 65 may be removed, a set screw 66 loosened, and the switch assembly 60 removed. It is then replaced, FIG. 3, by manually-adjustable stop member 67 held in fixed position by the set screw 66. The electrical or magnetic control of the valve 10 is particularly advantageous by reason of the fact that a very minimum of space is required for a highly effective magnetic operator. To assure ruggedness and long life, together with the minimum space requirements, it will be observed, FIG. 1, and particularly FIG. 7, that the supporting member 70 into which the magnet structure 44 is secured as by a set screw 71, is provided with a flat face 70a for receiving the rectifier assembly 33. This assembly has an overhanging ledge 33a through which extend fastening screws 72. The lower part of the assembly 33 has depending legs 33b and 33c which straddle the central boss 70b and within which the coil holder is captured. The alternating current connections are conveniently made at the top of the assembly 33, while the direct current connections are taken from the lower part of the assembly, as indicated by the leads 74 and 75 extending to the coil.

Figures 7, 8:
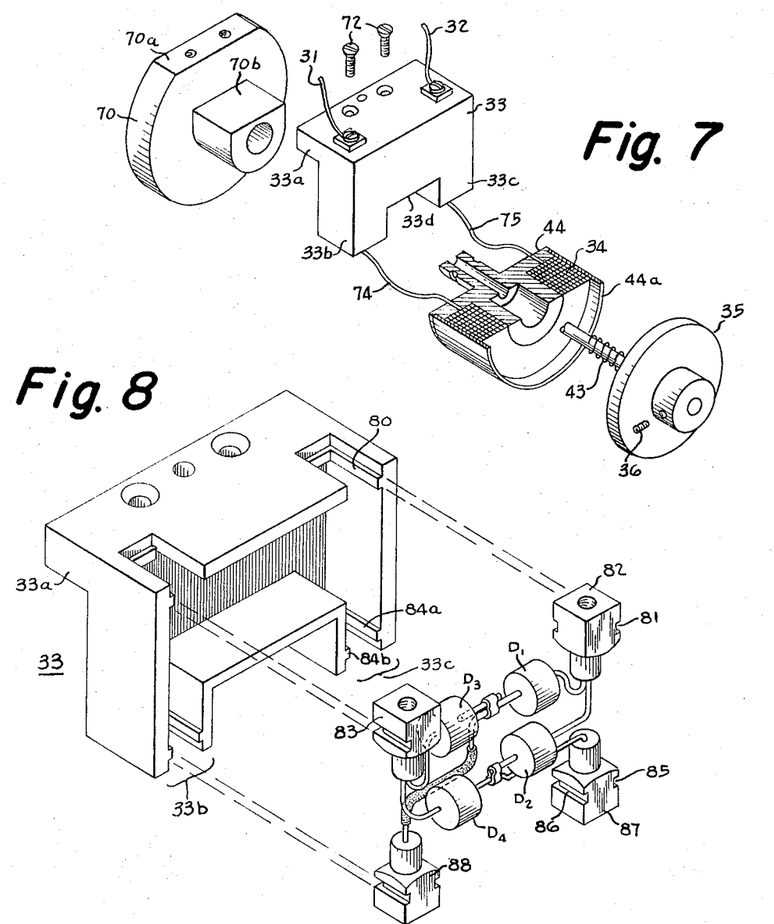
FIG. 7 is an exploded isometric view, partly in section, of the mounting structure for an encapsulated full-wave rectifier and magnetic operator of the arrangement of FIG. 1.
FIG. 8 is an exploded isometric view of the full-wave rectifier arrangement of FIGS. 1 and 7.
Figure 9:
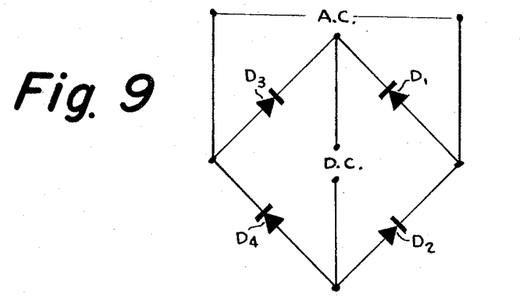
FIG. 9 is a wiring diagram of the full-wave rectifier valve with time-closing.

In order that the rectifying elements $D_1$-$D_4$ may be easily assembled and securely held in place during encapsulation by suitable potting material, the structure in FIG. 8 is utilized. The assembly 33 comprises a molded casing from which there extends the previously described ledge 33a and the downwardly depending legs 33b and 33c. Four channel openings are provided. The upper channels are provided with a ledge 80 which extends along one side and along the back portion to receive complementary grooves 81 provided on two adjacent sides of terminal structure 82. The lower channels have opposing ledges 84a and 84b to extend into grooves 85 and 86 provided on the respective terminal structures 87 and 88. Each of the terminal structures 82, 83, 87 and 88 receives one or more conductors as needed to form the bridge illustrated in FIG. 9 and to complete the connections to the diodes $D_1$-$D_4$. These connecting conductors, due to their diameter and short lengths, are relatively strong and provide a fairly rigid support for the diodes to retain them in place within the assembly housing 33 and into which there is then introduced the potting compound. By reason of the foregoing arrangements, the full-wave rectifier of FIGS. 7–9, though of small size, is nevertheless capable of withstanding adverse ambient conditions and yet is effective for continuous energization without development of excessive heat. The absence of voids in a potting compound of an epoxy resin assures complete dryness of the electrical components, thus minimizing the possibility of failure. The terminal members cannot rotate by reason of their square shape and mechanical interlocking. The housing 33 of Bakelite will include a closure member of the same material.

Figure 10:
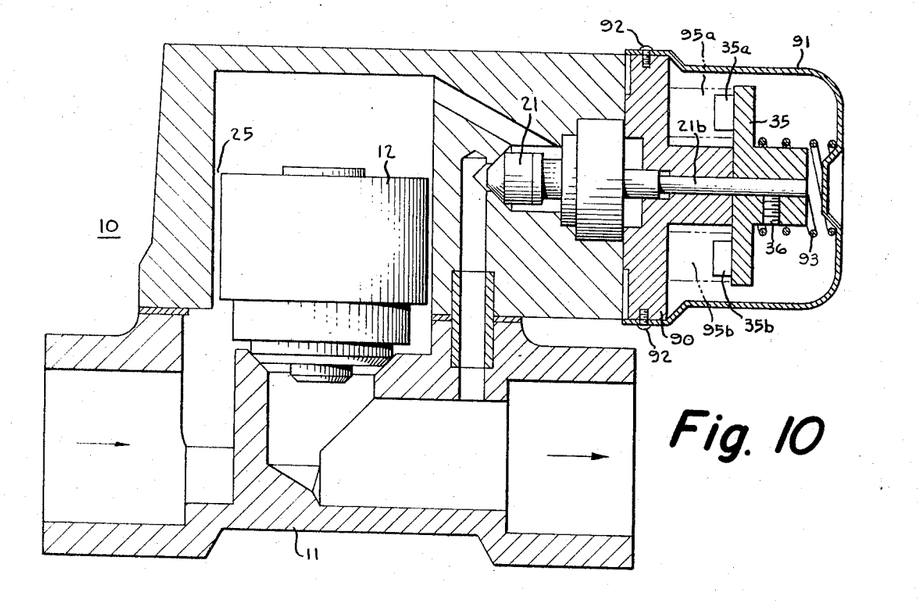
FIG. 10 is a sectional view of a manually-operable valve with time-closing.

It is to be understood that the valve 10 may be operated manually as desired by way of the knob 46. For some applications, the valve 10 may be manually operated by a somewhat more compact arrangement as shown in FIG. 10. By thus removing the magnet structure providing a slightly different shape for the seal holder or supporting member 90, the length of the assembly for controlling the control valve 21 is greatly decreased. Thus, the member 90 has extending through it a short stem 21b which by set screw 36 has attached to it an actuating member 35 which may be identical with the armature of FIG. 1 though not utilized as an armature. The housing or cover 91 is secured to supporting member 90 as by screws 92, while a spring 93 bears against an inturned end of cap 91 and against a face of the member 35. Thus, the spring 93 biases member 35 and stem 21b to maintain valve 21 normally closed.

Figure 11:
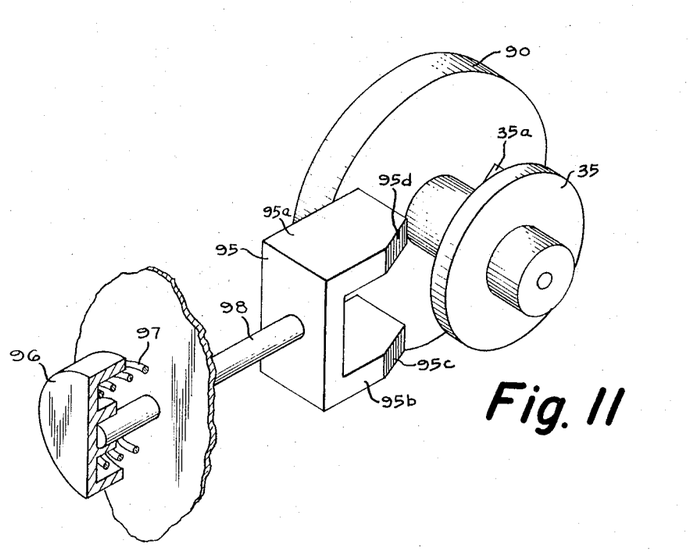
FIG. 11 is an isometric drawing of the valve actuator of FIG. 10.

To open the valve, there is utilized an actuating yoke 95, FIG. 11, having a pair of legs 95a and 95b which include inclined cam surfaces 95c and 95d for engagement with complementary cam surfaces 35a (35b not shown) of the member 35. By pressing on a push button 96 to overcome the bias of the spring 97, the stem 98 of yoke 95 moves the cam surfaces 95c and 95d against the cooperating cam surfaces to move the member 35 to the right, as viewed in FIG. 10, and thus to open the pilot or control valve 21 for immediate movement of the floating valve member 12 upwardly to open the main valve 10.

Momentary operation of push button 96 will produce a substantial movement of float member 12 and which will then upon release of push button 96 and closure of valve 21 slowly move downwardly. This provides the timing action needed wherever there should be flow of fluid for a predetermined time interval with automatic shut-off, as required for urinals, wash basins in public places, and in avoidance of the possibility of leaving water or other fluid running when it should be turned off.

Now that the principles of the invention have been fully explained and a number of applications thereof described, it is to be understood that many variations may be made within the scope of the appended claims and that features discussed in one modification may be utilized in conjunction with other modifications.

Figures 12, 13, 14, 15:
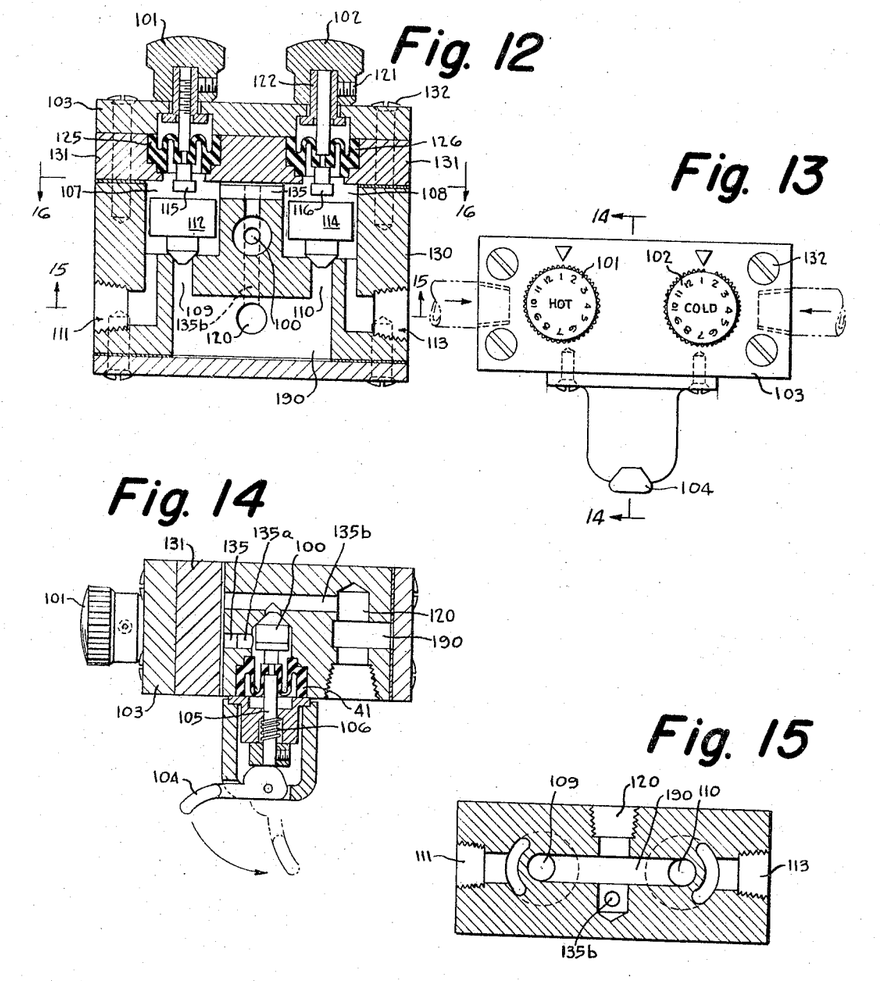
FIG. 12 is a sectional view of a double valve mixer.
FIG. 13 is a top plan view of the valve of FIG. 12.
FIG. 14 is a sectional view taken on the line 14—14 of FIG. 13.
FIG. 15 is a sectional view taken on the line 15—15 of FIG. 12.
Figure 16:
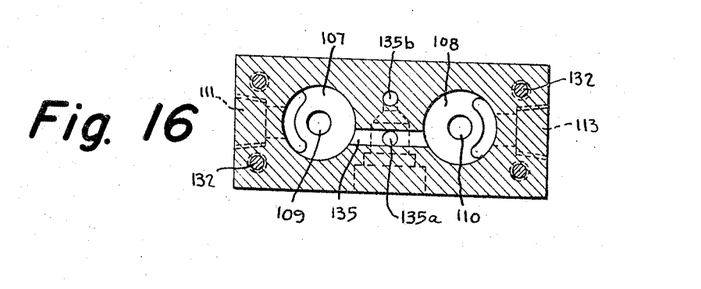
FIG. 16 is a sectional view taken on the line 16—16 of FIG. 12.

As further illustrative of the possibilities resulting from the invention, reference is to be had to the mixing valve of FIGS. 12–16. In the mixing valve, advantage is taken of the fact that a single pilot valve 100 may control simultaneously additional valves, thus to predetermine the rate of flow of two fluids. As shown in FIG. 13, there is provided a knob 101 for hot water and a knob 102 for cold water. Where substantial equality of flow is desired, both knobs will be set to the same relative positions. Thus, each knob has the numeral 1 opposite the stationary indicia embossed on the cover plate 103. To obtain flow of the mixture of hot and cold water, a lever 104 is operated downwardly, FIG. 14. This permits actuation of the stem 105 of valve 100 downwardly by a compression spring 106 concurrently to complete a flow connection from the float chambers 107 and 108 of the cold water valve 109 and the hot water valve 110.

The hot water entering at inlet 111 acts on the float member 112 to cause it to move upwardly. The same action occurs by reason of pressure of the cold water entering at 113 and causes the float member 114 to move upwardly. Both members move until they come to rest against adjustable stop members 115 and 116. The design of each valve element is of the throttling type, that is, the rate of flow through the valve will depend upon the extent of movement of valve elements 112 and 114. The mixture of hot and cold water flows by way of passage 120 to a single line which may include a single spigot for a wash basin or may extend to the sprinkler of a shower, or may be a process line. The metering control knobs 101 and 102, upon rotation to different positions, establish different rates of flow through their associated valves 109 and 110. Thus, the mixing device of FIG. 12 lends itself to many different applications. The knobs 102 and 103 are of the micrometer type, that is, each is secured by a set screw to an inner hub which is threaded to receive the threaded upper end of the stop member. For example, the knob 102 is secured by set screw 121 to the inner hub 122 which is threaded on the upper end of the stop member 116. The respective stop members 115 and 116 are provided with sealing elements 125 and 126 substantially identical with the one fully described above, and particularly well illustrated in FIG. 6.

It is to be further observed that there has been retained desirable features from the design of FIG. 1, namely, the valve base 130 as a single part shown with threaded openings for attachment to the connecting pipes, though, of course, these connections may be made by soldering or brazing. The valve body 131 is held in place by screws 132 together with the upper plate 103 and sealed by an interposed gasket. The connection from the down-stream side of both valves, as at 120, to the location of the control valve 100 is shown in broken lines in FIG. 12 leading from the cross-connection 135.

More particularly, the float connection from the float chambers 107 and 108 may be traced by way of the channel 135, thence by way of passageway 135a to the inlet side of valve 100. When the valve is open, the passage continues by way of passage 135b to the downstream side of the valves, i.e., to the outlet channel 190 and thence to the outlet 120.

The mixing valve arrangement of FIGS. 12–16 is particularly satisfactory for wash basins as well as showers and for the reason that the water temperature will normally be maintained at a relatively constant temperature by a hot water heater. Thus the hot and cold water settings will normally be maintained in pre-set positions. Thus, to obtain warm or relatively hot water, known designations on each dial will be immediately set to the stationary indicia. For many members of the family the same settings will be utilized and thus the same temperature of water will always be obtained by the flick of the control knob 104. As applied to processes and as flow regulating devices, the same reliability will be obtained. Remote control devices have already been suggested as applicable to the valves of this invention and they are particularly applicable to the operation of the pilot valve 100 of the mixing valve. Thus, the valve 100 may be operated by remote control by the electromagnetic operator, by air pressure, or by other suitable means known to those skilled in the art.

It is to be further emphasized that in rotating the control knobs 101 and 102 two variables are under control. First, a change in position of either of the control knobs will change the positions of the stops and hence, will change the rate of flow through one or both of the valves. The relative positions of the two valves will control the temperature of the mixed stream. Thus there is concurrent adjustment of rates of flow and temperatures of the stream. Thus a slow stream of suitable temperature can be achieved or a stream of high rate of flow at the same temperature may be attained.

Figure 17:
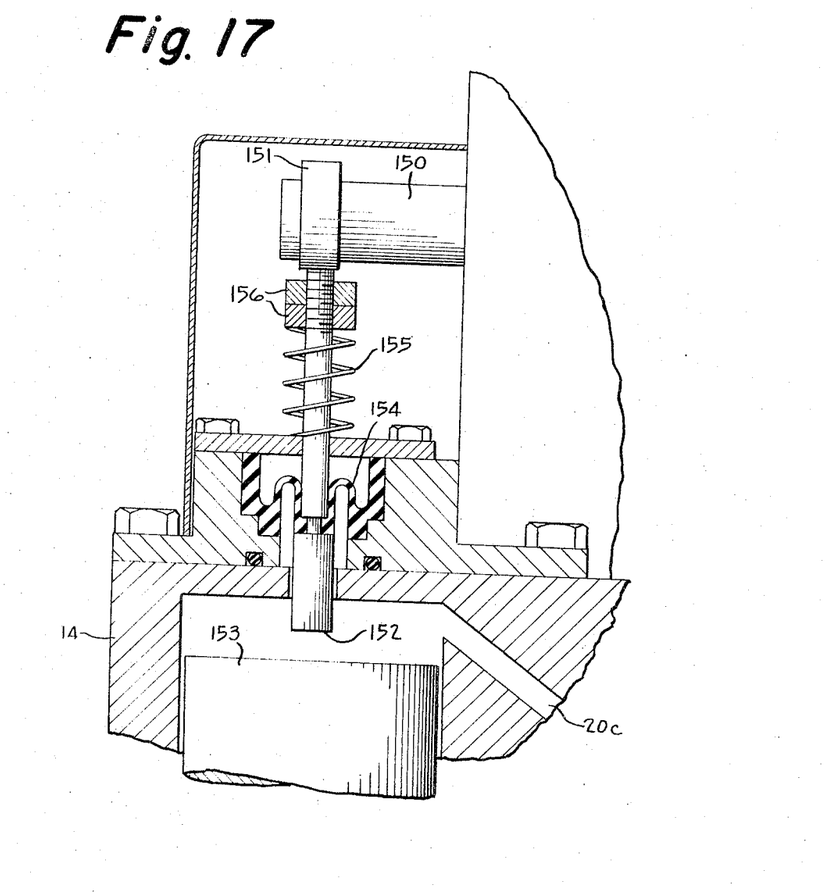
FIG. 17 is a sectional view of a fractional part of a valve embodying features which make it suitable for modulating the flow of fluids.

Instead of manual adjustment of the stop member as illustrated and just described in connection with FIGS. 12–16, that stop member may be actuated, FIG. 17, by any suitable means as by a drive shaft 150 actuated by a servomotor or other mechanism. The drive shaft 150 has secured to it a cam 151, which upon rotation thereof, predetermines the position of a stop member 152 for regulating the extent to which the floating valve member 153 may rise, it being understood that this float member and its mode of operation will be identical with those described for previous modifications. A sealing member 154 corresponds with the sealing members 125 and 126 of FIG. 12 and also with the sealing member 41 of FIG. 6. A spring 155 urges the stop member 152 upwardly. The compression of the spring may be predetermined by suitably setting the positions of lock nuts 156 on the threaded end of the stop member 152. Thus, the flow of fluid may be modulated, i.e., increased or decreased, by rotating shaft 150 and cam 151 in a forward or reverse direction as may be required.

Figures 18, 19, 20:
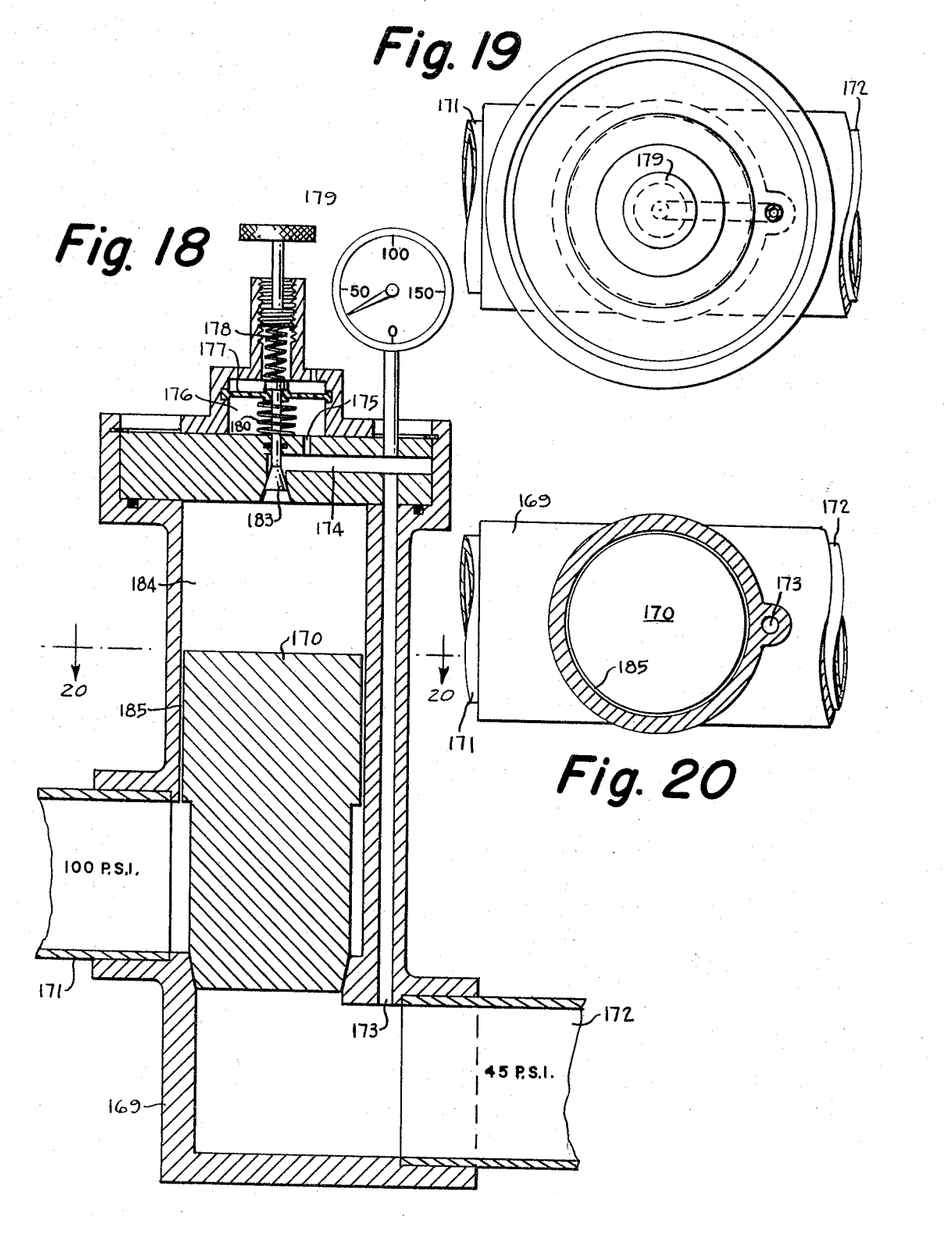
FIG. 18 is a sectional view of a valve embodying a modification of the invention.
FIG. 19 is a top plan view of the valve of FIG. 18 with the pressure gage omitted.
FIG. 20 is a sectional view taken on line 20—20 of FIG. 18.

The valve of the present invention may also be utilized as a pressure controller. As shown in FIG. 18, the valve float member 170 is of the throttling type with the inlet 171 to the valve shown as having applied thereto a pressure of 100 pounds per square inch. It is desired to maintain at the outlet 172 a pressure of 45 pounds per square inch. The outlet pressure is transmitted by way of flow connections 173, 174 and 175 to a diaphragm chamber 176. A diaphragm 177 has bearing against it a spring 178, the compression of which may be adjusted by rotating a knob 179. A second spring 180 is disposed to preload the opposite side of the diaphragm. It will be seen that if the pressure on the down-stream side falls below 45 pounds per square inch, or any other value set by knob 179, the force from spring 178 will move the diaphragm 177 downwardly, and through its connection with the stem of a control valve 183 will open the valve to complete the connection between the float chamber 184 and the low-pressure side of the valve, as at 172, 173. The opening of the control valve 183 initiates rise of float member 170 which increases the opening through the valve to increase the pressure on the down-stream side. As soon as this pressure rises, it is effective with the aid of spring 180 immediately to close valve 183. The mass of float member 170 is relatively large and the flow passage 185 is small. Thus, while there is intermittent up and down movements of valve member 170, it is effective in maintaining within reasonably close limits the set pressure on the down-stream side of the valve.

It is again emphasized that the valves of the present invention are of great utility for piping systems of either the low pressure or the high pressure type and are equally applicable for the control of small streams or large streams. Thus there is no limitation on the size which the valve may take or in respect to the fluid pressure. Where it is of a very high order, metal seats will replace the rubber-like materials described above, and for high pressure oil systems, sealing means in place of the sealing element 41 will be of the type which will prevent leakage around the stream 21b. Such sealing means include O-rings which are satisfactory for high pressure oil, but wholly unsatisfactory for low pressure systems and for other fluids, such as water and gas.

The larger the size of the float member 12, the greater will be the advantages in that large forces will be available to move the float member, whereas if a valve of like size were to be moved by manual means, the size and effort required to move large valve members such as used on penstocks and the like would be very great indeed.

Should the fluid, including liquids, controlled by the valve be "dirty," the possibility of clogging of the bypass 20c, 20b is avoided by a built-in strainer comprising the small annuar passageway 25 which may be of the order of 0.001 inch. Thus, small particles cannot pass through that passageway and thus build up deposits in the bypass 20c, 20b. The small annular passage 25, even though it may become partially clogged, will not prevent movement of the float member 12 by reason of the large forces developed upon it. During such movement, any accumulations of extroneous material will be dislodged. Thus, the passage itelf is self-cleaning.

The multiple-face sealing device 41 is particularly advantageous and may be utilized for valve stems of all kinds.

What is claimed is:
1. A valve comprising
  an inlet and an outlet,
  a valve seat surrounding an opening for passage of fluid therethrough from inlet to outlet,
  a freely floating valve member,
  a valve body having a float chamber within which said freely floating valve member is guided for movement toward and away from said valve seat, said freely floating valve member having a close fit within said chamber for controlled flow of fluid from the end thereof adjacent said seat into a pressure part of said chamber remote from said seat, a flow passage extending from said pressure part of said chamber to the outlet side of said valve, a control valve having a valve member movable to and from a valve seat for opening and closing said last-named flow passage for producing movement of said valve member toward and away from said valve seat, each of said valve members having in mechnically interlocked relation therewith resilient sealing elements for respectively producing a tight seal with said valve seats when in their closed positions, each said sealing element having an extension disposed normal to the axis of its associated valve member and nesting within a groove of its said valve element, and said sealing element of said floating member having a cylindrical section extending parallel to the axis of said floating valve member and two frusto-conical surfaces, one engaging said valve seat and the other engaging a frusto-conical surface of said floating valve member, said frusto-conical surfaces extending approximately at 45° angles to the axis of said floating valve member, said floating member having a cylindrical recess into which said cylindrical section extends.

2. The valve of claim 1 in which said control valve is provided with a stem, sealing means for said stem comprising a resilient member having at least one bellows-like fold, one end of said fold being mechanically interlocked with said stem, and the other bellows-like fold having a sharp angled shoulder nesting against a complementary shoulder of said valve body and having a thickened portion with one end thereof disposed for engagement with additional sealing surfaces, said bellows folds being effective for application of fluid pressure in directions to increase the sealing effectiveness of said sealing member.

3. The valve of claim 2 in which said stem has an enlarged portion between said bellows-like fold and the end thereof carrying its said sealing element providing an area approximately equal to the area of said fold to provide a fluid pressure balance on said stem.

4. The valve of claim 1 in which said valve member of said control valve is provided with
a sealing member of flexible resilient material comprising a thick outer cylinder from which there extends a thick cylinder of lesser diameter and forming sealing surfaces at right angles one to the other, said outer cylinder having a bellows-like fold relatively thin as compared with the thickness of said outer cylinder, said bellows-like fold terminating in a thickened end portion with an opening therethrough for interlocking engagement with said last-mentioned valve member, said bellows-like fold providing for axial movement of said enlarged cylindrical end and its associated valve member.

5. The combination with a valve having a control element movable between first and second positions for causing said valve to move between open and closed positions,
of an electromagnet for actuating said control element comprising magnet structure having a central pole-piece and an outer pole-piece,
a coil disposed between said pole pieces,
an armature carried by said control element, which armature with said valve in closed position engaging said central pole member but at all times being in spaced relation with said outer pole member,
said magnet structure including an elongated passage within which said control element is slidably mounted,
a full-wave rectifier hermetically sealed in a housing having depending legs straddling the structure forming said elongated passageway and including terminals for direct attachment to the respective ends of said coil, and
terminals carried at the end of said housing opposite said legs for application to said full-wave rectifier of alternating current for control of said movement of said element between two control positions thereof.

6. The combination of claim 5 in which said housing is provided with laterally extending recesses each having ledges, said terminals having recesses for receiving said ledges, and means including conductors and four diodes forming a full-wave rectifier supported from said terminals, whereby said rectifier and said terminals are fully self-supporting, and a potting compound filling said recesses and encapsulating said diodes and parts of said terminals.

7. The combination of claim 6 in which said terminals include terminal screws and in which said recesses and said terminals are rectangular for mechanically preventing turning thereof upon tightening of said terminal screws.

8. In combination, a valve including
an inlet and an outlet,
a valve seat surrounding an opening for passage of fluid therethrough from inlet to outlet,
a freely floating valve member,
a valve body having a float chamber within which said freely floating valve member is guided for movement toward and away from said valve seat, said freely floating valve member having a close fit within said chamber for controlled flow of fluid from the end thereof adjacent said seat into a pressure part of said chamber remote from said seat,
a flow passage extending from said pressure part of said chamber to the outlet side of said valve,
a control valve having a valve member movable to and from a valve seat for opening and closing said last-named flow passage for producing movement of said valve member toward and away from said valve seat,
an electromagnetic actuator for a valve comprising magnetic structure having a centrally disposed cylindrical pole piece of substantial thickness from which a flange radially extends,
a coil surrounding said cylindrical pole piece,
said magnetic structure having a supporting member extending outwardly from said flange in a direction opposite to that of said cylindrical pole piece,
an outer cylindrical member of magnetizable material surrounding said flange and extending over said coil and to a point beyond the end of said pole piece,
said supporting member having a bore extending axially thereof,
a valve actuating stem extending from said valve member of said control valve slidably mounted within said bore,
said cylindrical pole piece being counterbored,
a spring surrounding said stem and disposed within said counterbore,
said stem having an end-portion protruding outwardly of said pole piece,
an armature of magnetizable material secured to said stem and in the form of a disc the outside diameter of which is less than the internal diameter of said outer cylindrical member and the thickness of which is greater than the distance said outer cylindrical member extends beyond the end of said cylindrical pole piece, and
a stop for said armature for limiting its movement by said spring to maintain said armature at all times in overlapping relation with the end portion of said outer cylindrical member.

9. In combination, a valve including
an inlet and an outlet,
a valve seat surrounding an opening for passage of fluid therethrough from inlet to outlet,
a freely floating valve member,
a valve body having a float chamber within which said freely floating valve member is guided for movement toward and away from said valve seat, said freely floating valve member having a close fit within said chamber for controlled flow of fluid from the end thereof adjacent said seat into a pressure part of said chamber remote from said seat, a flow passage extending from said pressure part of said chamber to the outlet side of said valve, a control valve having a valve member movable to and from a valve seat for opening and closing said last-named flow passage for producing movement of said valve member toward and away from said valve seat, an electromagnetic actuator comprising magnetic structure having a centrally disposed cylindrical pole piece of substantial thickness from which there radially extends a flange, a coil surrounding said cylindrical portion, said magnetic structure having a supporting member extending outwardly from said flange opposite said cylindrical pole piece, an outer cylindrical member of magnetizable material surrounding said flange and of width greater than said cylindrical pole piece to extend beyond the end portion remote from said flange, said magnetic structure including said supporting member having a bore extending axially thereof, a driven member comprising a valve stem extending from said valve member to said control valve slidably mounted within said bore, said cylindrical pole piece being counterbored, a spring surrounding said stem and disposed within said counterbore, said driven member having an end portion protruding outwardly of said pole piece, an armature of magnetizable material secured to said driven member in the form of a disc the outside diameter of which is less than the internal diameter of said outer cylindrical member and the thickness of which is greater than the distance at which said outer cylindrical member extends beyond the face of said cylindrical pole member, and a stop for said armature for limiting it to movement in one direction by said spring and in the other direction by energization of said coil through limits which maintain said armature in overlapping relation with the end portion of said outer cylindrical member.

References Cited by the Examiner

UNITED STATES PATENTS

| | | | |
|---|---|---|---|
| 767,849 | 7/1904 | Stillman | 251—44 |
| 1,135,003 | 4/1915 | Fairbank | 251—44 X |
| 1,173,834 | 2/1916 | Metzger | 137—489.3 |
| 1,648,126 | 11/1927 | Hosmer | 137—607 |
| 2,155,170 | 4/1939 | Odend'Hal | 137—489.3 |
| 2,264,531 | 12/1941 | Horni | 317—175 |
| 2,339,352 | 1/1944 | Ray | 251—30 |
| 2,361,063 | 10/1944 | Sandhofer | 251—285 X |
| 2,587,408 | 2/1952 | Trask | 277—33 |
| 2,675,508 | 4/1954 | Ray | 317—175 |
| 2,768,807 | 10/1956 | Cahen et al. | 251—333 X |
| 2,820,478 | 1/1958 | Hendry | 137—607 |
| 2,870,986 | 1/1959 | Vargo | 251—30 X |
| 2,893,425 | 7/1959 | Rimsha et al. | 137—607 |
| 3,061,264 | 10/1962 | Rupert | 251—44 X |
| 3,122,616 | 2/1964 | Rice et al. | 200—61.86 |
| 3,162,734 | 12/1964 | Mansell | 200—61.86 |
| 3,171,659 | 3/1965 | Anderson et al. | 277—33 |

FOREIGN PATENTS 210,973  10/1956  Australia.

WILLIAM F. O'DEA, *Primary Examiner.*

D. H. LAMBERT, *Assistant Examiner.*